United States Patent
Jang et al.

(10) Patent No.: US 9,673,633 B2
(45) Date of Patent: Jun. 6, 2017

(54) APPARATUS AND METHOD FOR MINIMIZING DISTRIBUTION LOSS IN CONSIDERATION OF SECTION LOAD CHARACTERISTICS OF DISTRIBUTION SYSTEM

(75) Inventors: Moon-Jong Jang, Daejeon (KR); Bok-Nam Ha, Daejeon (KR); Sung-Woo Lee, Daejeon (KR); Sang-Ok Kim, Daejeon (KR); Dong-Wan Seo, Daejeon (KR); Won Namkoong, Daejeon (KR)

(73) Assignee: Korea Electric Power Corporation, Seoul (KR)

( * ) Notice: Subject to any disclaimer, the term of this patent is extended or adjusted under 35 U.S.C. 154(b) by 632 days.

(21) Appl. No.: 14/347,402

(22) PCT Filed: Sep. 30, 2011

(86) PCT No.: PCT/KR2011/007276
§ 371 (c)(1),
(2), (4) Date: Mar. 26, 2014

(87) PCT Pub. No.: WO2013/047931
PCT Pub. Date: Apr. 4, 2013

(65) Prior Publication Data
US 2014/0232186 A1    Aug. 21, 2014

(30) Foreign Application Priority Data
Sep. 27, 2011    (KR) .......................... 10-2011-0097717

(51) Int. Cl.
*H02J 3/00*    (2006.01)
*H02J 4/00*    (2006.01)
*H02J 3/14*    (2006.01)

(52) U.S. Cl.
CPC ................ *H02J 4/00* (2013.01); *H02J 3/005* (2013.01); *H02J 3/14* (2013.01); *Y02E 40/76* (2013.01); *Y04S 10/545* (2013.01); *Y10T 307/25* (2015.04)

(58) Field of Classification Search
CPC ...... H02J 3/00; H02J 3/005; H02J 3/12; H02J 3/14; H02J 3/26; H02J 4/00; Y02E 40/76; Y04S 10/545; Y10T 307/25
(Continued)

(56) References Cited

U.S. PATENT DOCUMENTS

| 7,778,738 B2 * | 8/2010 | Taft .......................... H02J 3/14 323/299 |
| 8,364,609 B2 * | 1/2013 | Ozog ............... G06Q 10/06315 705/412 |

(Continued)

FOREIGN PATENT DOCUMENTS

| JP | 07-170662 A | 7/1995 |
| JP | 11-252794 A | 9/1999 |

(Continued)

OTHER PUBLICATIONS

International Search Report, w/ English translation thereof, issued in International Application No. PCT/KR2011/007276 dated Sep. 28, 2012.

*Primary Examiner* — Levi Gannon
(74) *Attorney, Agent, or Firm* — McDermott Will & Emery LLP (57) ABSTRACT

Provided are an apparatus and method for minimizing a distribution loss which reconstructs the system construction of a distribution system in consideration of section load characteristics of mutually different distribution system. The apparatus for minimizing a distribution loss which determines a loss calculation period for detecting a loss minimization time point using mutually different distribution sys-
(Continued)

tems, calculates loss values of mutually different distribution systems set according to each time point of the loss calculation period, and calculates a total loss value, and selects the mutually different distribution systems one by one during the loss calculation period, and calculates a loss value for specific systems of each distribution system in consideration of a change of a section load in each selected distribution system, determines a loss minimization time point using the specific system loss value of each distribution system and the total loss value.

8 Claims, 11 Drawing Sheets

(58) Field of Classification Search
USPC .......................................................... 307/11
See application file for complete search history.

(56) References Cited

U.S. PATENT DOCUMENTS

| 2003/0110146 | A1* | 6/2003 | Machitani | .............. | G06Q 50/06 |
|---|---|---|---|---|---|
| | | | | | 705/412 |
| 2013/0030579 | A1* | 1/2013 | Milosevic | ................. | H02J 3/14 |
| | | | | | 700/286 |

FOREIGN PATENT DOCUMENTS

| JP | 2009-284614 A | 12/2009 |
|---|---|---|
| JP | 2011-010522 A | 1/2011 |

* cited by examiner

APPARATUS AND METHOD FOR MINIMIZING DISTRIBUTION LOSS IN CONSIDERATION OF SECTION LOAD CHARACTERISTICS OF DISTRIBUTION SYSTEM

RELATED APPLICATIONS

This application is the U.S. National Phase under 35 U.S.C. §371 of International Application No. PCT/KR2011/007276, filed on Sep. 30, 2011, which in turn claims benefit of Korean Application No. 10-2011-0097717, filed on Sep. 27, 2011, the disclosures of which Application are incorporated by reference herein.

TECHNICAL FIELD

The present invention relates to an apparatus and method for minimizing distribution loss while considering the section load characteristics of a distribution system and, more particularly, to an apparatus and method for minimizing distribution loss while considering the section load characteristics of a distribution system, which select a specific period for calculating loss minimization, calculate a period in which a loss value has been minimized while considering variations in section load in the corresponding period, and apply a loss minimization solution based on the calculated period, thereby reconfiguring the distribution system.

The present application claims the benefit of the filing date of Korean Patent Application No. 10-2011-0097717 filed on Sep. 27, 2011, the entire content of which is incorporated herein by reference.

BACKGROUND ART

Distribution systems are characterized in that various types of loads are mixed and load fluctuation is high. Furthermore, as time elapses, power losses increase for reasons, such as new installations and extensions in factories, buildings and homes and increases in the demand of power, thereby worsening imbalance between lines.

In order to overcome the above problem, the reconfiguration of a distribution system that is intended to change the structure of the distribution system using changes in the locations and states of linked and section switches in a system.

With regard to a representative technique, a distribution system is reconfigured using an optimality-guaranteed branch and bound method of calculating the losses of an open system while successively opening the switches of a distribution system in a state in which all the switches have been closed. Furthermore, with regard to another technique, a distribution system is reconfigured using a branch exchange method of changing the configuration of the distribution system by selecting a section switch and a linked switch and changing the states of the switches. In addition, a technique using a simulated annealing (SA) method, that is, approximate optimal solution search, and a technique using a tabu search method, that is, tabu search, are used.

Although the loads of a system should be accurately known in order to apply the techniques for the reconfiguration of a distribution system to sites in the field, the conventional techniques are problematic in that they cannot acquire an optimized solution in practice because they ignore the above-described point.

In order to overcome this problem, it is necessary to measure loads in real time, acquire an optimal solution in real time, and change the configuration of a system in real time, but this is impossible in practice. Even if it were possible, the load would have already changed to a pattern different from that at the time of the measurement, and thus there is a limitation in that an acquired solution is still not an optimal solution.

In addition, in order to measure an optimal solution in real time, it is necessary to replace equipment, infrastructure, and systems at sites in the field, which requires massive investment. Moreover, even though a solution is optimal in a current period, the solution is still not an optimal solution because the load frequently changes. Accordingly, only an effect in a limited range can be expected, and thus a problem arises in that it is difficult to considerably improve investment versus efficiency.

DISCLOSURE

Technical Problem

Accordingly, the present invention has been made keeping in mind the above problems occurring in the prior art, and an object of the present invention is to provide an apparatus and method for minimizing distribution loss while considering the section load characteristics of a distribution system, which select a specific period for calculating loss minimization, calculate a period in which a loss value has been minimized while considering variations in section load in the corresponding period, and apply a loss minimization solution based on the calculated period, thereby reconfiguring the distribution system.

Technical Solution

In order to accomplish the above object, in accordance with an embodiment of the present invention, there is provided an apparatus for minimizing distribution loss, the apparatus reconfiguring a system configuration of a distribution system while considering section load characteristics of different distribution systems, the apparatus including a calculation period selection unit configured to determine a loss calculation period for detecting a loss minimization time point using the different distribution systems; a total loss value calculation unit configured to calculate a total loss value by calculating loss values of the different distribution systems set for respective time points of the loss calculation period; and a loss minimization solution determination unit configured to select each of the different distribution systems once during the loss calculation period, and to calculate a specific system configuration loss value of each of the distribution systems while considering variations in section load of the selected distribution system, wherein the loss minimization solution determination unit determines the loss minimization time point using the specific system configuration loss values of the distribution systems and the total loss value.

The apparatus of claim may further include a system reconfiguration unit configured to reconfigure the system configuration of the distribution system using a distribution system corresponding to the loss minimization time point.

The total loss value calculation unit may calculate a loss value of each of the distribution systems for the respective time points by adding section loads of each of the distribution systems set for the respective time points of the loss calculation period, and may calculate the total loss value by adding the loss values of the respective distribution systems.

The loss minimization solution determination unit may calculate a loss value for each of the time points by adding section loads of the selected distribution system for each of the time points of the loss calculation period, and may calculate a specific system configuration loss value of the selected distribution system by adding the loss values for the respective time points.

The loss minimization solution determination unit may select a specific system configuration loss value that belongs to the specific system configuration loss values and is closest to the total loss value of the distribution system, and may determine a time point, at which a distribution system corresponding to the closest specific system configuration loss value during the loss calculation period has been set, to be the loss minimization time point.

In order to accomplish the above object, in accordance with another embodiment of the present invention, there is provided a method of minimizing distribution loss, the method reconfiguring a system configuration of a distribution system while considering section load characteristics of different distribution systems, the method including determining a loss calculation period for detecting a loss minimization time point using the different distribution systems; calculating a total loss value by calculating loss values of the different distribution systems set for respective time points of the loss calculation period; selecting each of the different distribution systems once during the loss calculation period, and calculating a specific system configuration loss value of each of the distribution systems while considering variations in section load of the selected distribution system; and wherein the loss minimization time point is determined using the specific system configuration loss values of the distribution systems and the total loss value.

The method may further include reconfiguring the system configuration of the distribution system using a distribution system corresponding to the loss minimization time point.

Calculating the total loss value may include calculating a loss value of each of the distribution systems for the respective time points by adding section loads of each of the distribution systems set for the respective time points of the loss calculation period; and calculating the total loss value by adding the loss values of the respective distribution systems.

Calculating the specific system configuration loss value may include calculating a loss value for each of the time points by adding section loads of the selected distribution system for each of the time points of the loss calculation period; and calculating a specific system configuration loss value of the selected distribution system by adding the loss values for the respective time points.

The method may further include selecting a specific system configuration loss value that belongs to the specific system configuration loss values and is closest to the total loss value of the distribution system; and determining a time point, at which a distribution system corresponding to the closest specific system configuration loss value during the loss calculation period has been set, to be the loss minimization time point.

Advantageous Effects

In an embodiment of the present invention, a loss calculation period is previously selected, a distribution system configuration representative of the loss calculation period is determined, and a distribution system is reconfigured in real time. Accordingly, the distribution system can be reconfigured by calculating an optimal solution without performing unnecessary processes, such as remote measurement, state prediction and system analysis, and the number of line opening and closing operations for minimizing risks attributable to the life span of a switch, an erroneous operation and no operation can be reduced.

Furthermore, in an embodiment of the present invention, with system sections being set for each distribution system configuration during a loss calculation period, a period for which a specific system configuration loss value is minimized with respect to variations in the section loads of each calculation period is set as a representative loss minimization period, and distribution system configurations at sites in the field are reconfigured using a distribution system configuration corresponding to the representative loss minimization period, thereby minimizing losses and equalizing loads and thus ensuring economic efficiency and the stability of the system.

MODE FOR INVENTION

The present invention will be described in detail below with reference to the accompanying drawings. Repeated descriptions and descriptions of known functions and configurations which have been deemed to make the gist of the present invention unnecessarily obscure will be omitted below. The embodiments of the present invention are intended to fully describe the present invention to a person having ordinary knowledge in the art to which the present invention pertains. Accordingly, the shapes, sizes, etc. of components in the drawings may be exaggerated to make the description clearer.

Figure 1:
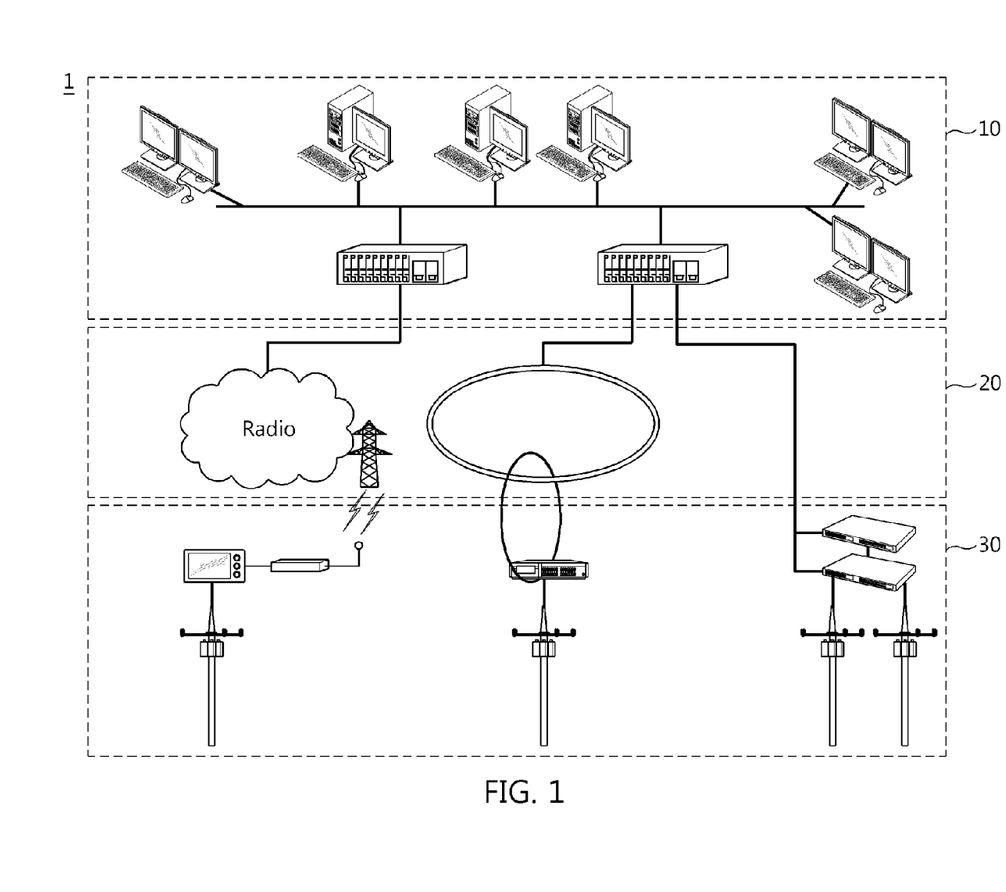
FIG. 1 is a drawing of an example of a distribution system to which an apparatus for minimizing distribution loss according to an embodiment of the present invention is intended to be applied.
Figure 2:
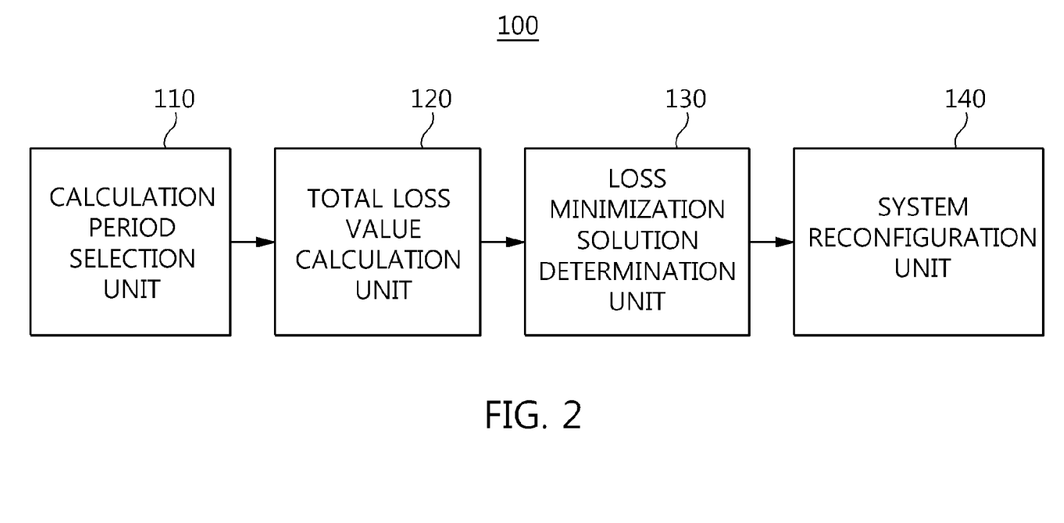
FIG. 2 is a diagram schematically illustrating an apparatus for minimizing distribution loss while considering the section load characteristics of a distribution system according to an embodiment of the present invention.
Figure 3:
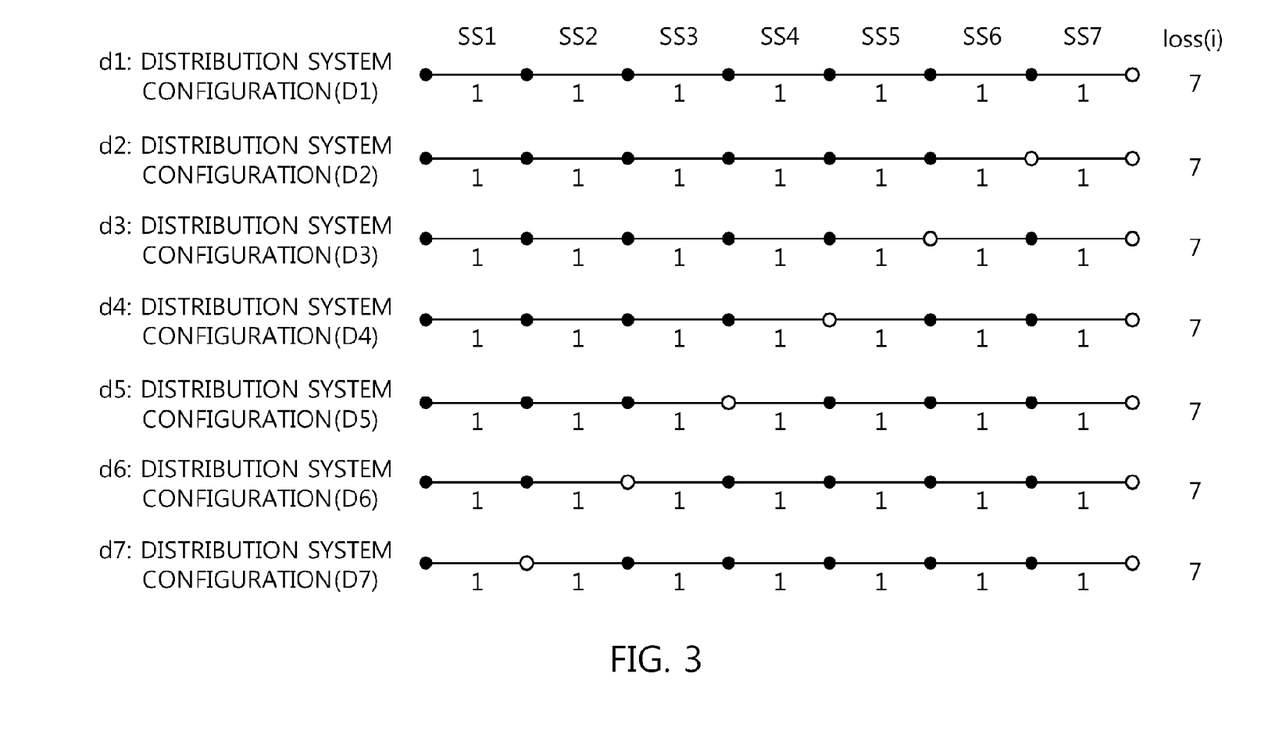
FIG. 3 is a diagram illustrating an example of distribution system configurations for calculating a total loss value according to an embodiment of the present invention.

FIG. 1 is a drawing of an example of a distribution system to which an apparatus for minimizing distribution loss according to an embodiment of the present invention is intended to be applied. FIG. 2 is a diagram schematically illustrating an apparatus for minimizing distribution loss while considering the section load characteristics of a distribution system according to an embodiment of the present invention. FIG. 3 is a diagram illustrating an example of distribution system configurations for calculating a total loss value according to an embodiment of the present invention. FIGS. 4 to 10 are diagrams illustrating an example of distribution system configurations for calculating specific system configuration loss values according to an embodiment of the present invention.

As illustrated in FIG. 1, a distribution system 1 according to an embodiment of the present invention includes a plurality of devices having communication functions in order to operate a distribution system. That is, the distribution system 1 includes a central server 10 configured to be in charge of the distribution system 1 and terminal device 30s distributed at sites along distribution lines. In this case, the central server 10 and the terminal devices 30 are interconnected over a communication network 20, such an optical line, a power line communication (PLC) network, a hybrid fiber coax (HFC) network, or a wireless network.

Since the distribution system 1 embraces various types of loads in a mixed fashion, an apparatus 100 for minimizing distribution loss, as illustrated in FIG. 2, is provided in the central server 10 in order to reconfigure a distribution system while considering the section load characteristics of the distribution system.

The apparatus 100 for minimizing distribution loss includes a calculation period selection unit 110, a total loss value calculation unit 120, a loss minimization solution determination unit 130, and a system reconfiguration unit 140.

The calculation period selection unit 110 selects a loss calculation period d1-dn for calculating a loss minimization time point using different distribution systems. The calculation period selection unit 110 transfers the selected loss calculation period d1-dn to the total loss value calculation unit 120. In this case, a day, a week, weekdays, a weekend, a month, a quarter of a year, or a year may be selected as the loss calculation period d1-dn. Alternatively, a day, a night, or midnight into which a day is divided may be selected. The loss calculation period d1-dn is determined after the appropriate frequency at which the distribution system is reconfigured has been taken into consideration.

The total loss value calculation unit 120 calculates loss values loss(di) for different distribution system configurations D1 to D7 set for respective set time points of the loss calculation period d1-dn. That is, the total loss value calculation unit 120 calculates loss values ranging from a loss value loss(d1) at a time point d1 to a loss value loss(dn) at a time point dn. Furthermore, the total loss value calculation unit 120 calculates a total loss value losstotal by adding the loss values ranging from the loss value loss(d1) at the time point d1 to the loss value loss(dn) at the time point dn. The total loss value calculation unit 120 transfers the total loss value losstotal to the loss minimization solution determination unit 130.

More specifically, assuming that the loss calculation period is set to "seven days," different distribution system configurations D1 to D7 are set for respective time points of the loss calculation period d1-dn and each of the distribution system configurations D1 to D7 is divided into seven sections SS1 to SS7, as illustrated in FIG. 3, the load, that is, the loss value, of each of sections SS1 to SS7, which constitute the distribution system configuration D1, at the time point d1 is "1," and thus the total loss value calculation unit 120 calculates a loss value at the time point d1 as "loss(d1)=7." Furthermore, the loss value of each of sections SS1 to SS7, which constitute the distribution system configuration D2, at the time point d2 is "1," and thus the total loss value calculation unit 120 calculates a loss value at the time point d2 as "loss(d2)=7." In the same manner, the total loss value calculation unit 120 calculates loss values "loss(d3)=7," "loss(d4)=7," "loss(d5)=7," "loss(d6)=7" and "loss(d7)=7" at the remaining respective time points d3 to d7. Moreover, the total loss value calculation unit 120 obtains a total loss value "losstotal=49" by adding the calculated loss values at the respective time points, as described in the following Equation 1:

$$losstotal=loss(d1)+loss(d2)+ \ldots +loss(d7)=49 \quad (1)$$

Referring back to FIGS. 2 and 4, the loss minimization solution determination unit 130 selects each of different distribution systems once during a loss calculation period d1-dn, and calculates specific system configuration loss values while considering variations in the section loads of the selected distribution systems.

Figure 4:
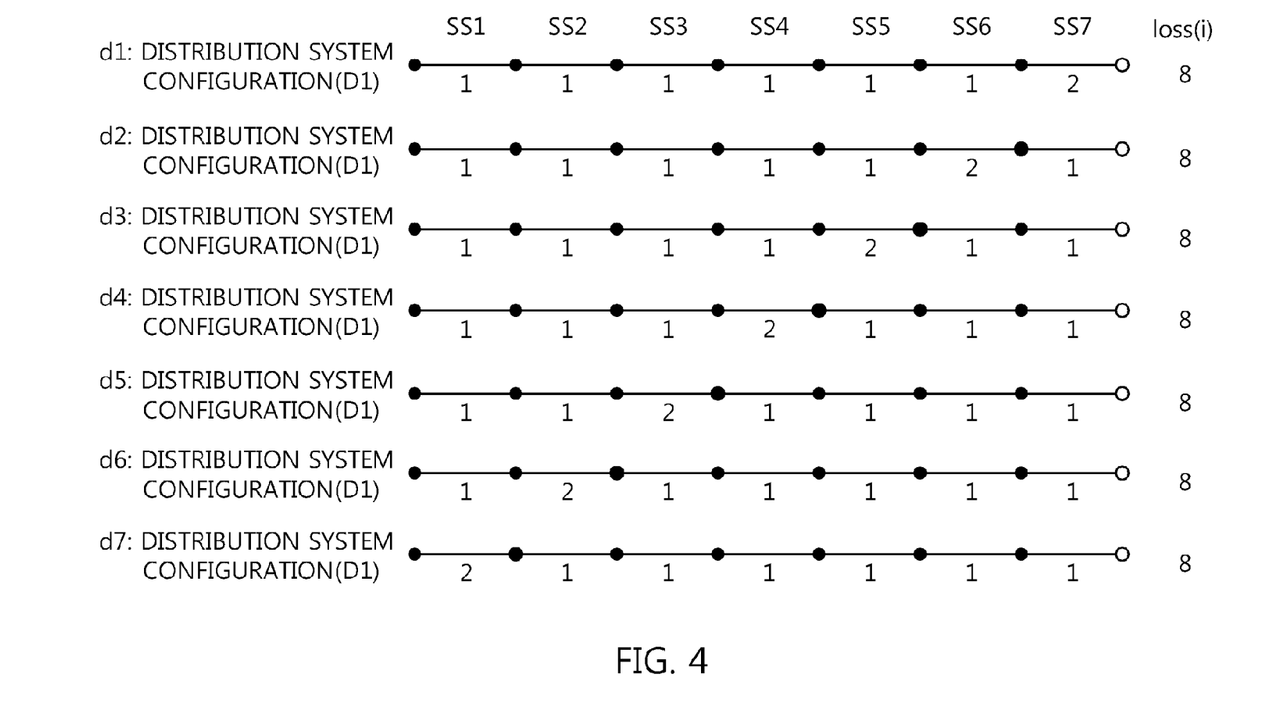
FIGS. 4 to 10 are diagrams illustrating an example of distribution system configurations for calculating specific system configuration loss values according to an embodiment of the present invention.

More specifically, the loss minimization solution determination unit 130 calculates the specific system configuration loss value of a distribution system configuration D1 by adding the section loads of the sections SS1 to SS7 of the distribution system configuration D1 at time points d1 to d7, with the system configuration being set to the distribution system configuration D1 during a loss calculation period d1-d7.

In other words, since the loss value of each of the sections SS1 to SS6 of the distribution system configuration D1 at the time point d1 is "1" and the loss value of the section SS7 is "2," the total loss value calculation unit 120 calculates a loss value at the time point d1 as "loss(d1)=8." Furthermore, since the loss value of each of the sections SS1 to SS5 and SS7 of the distribution system configuration D1 at the time point d2 is "1" and the loss value of the section SS6 is "2," the total loss value calculation unit 120 calculates a loss value at the time point d2 as "loss(d2)=8." In the same manner, the total loss value calculation unit 120 obtains the loss values of the sections of the distribution system configuration D1 at the respective remaining time points d3 to d7, that is, "loss(d3)=8," "loss(d4)=8," "loss(d5)=8," "loss(d6)=8," and "loss(d7)=8". Moreover, the total loss value calculation unit 120 obtains the total specific system configuration loss value of the distribution system configuration D1, that is, "loss(D1to1 )=56," by adding the loss values at the respective time points d1 to d7 during the loss calculation period, as described in Equation 1.

Figure 5:
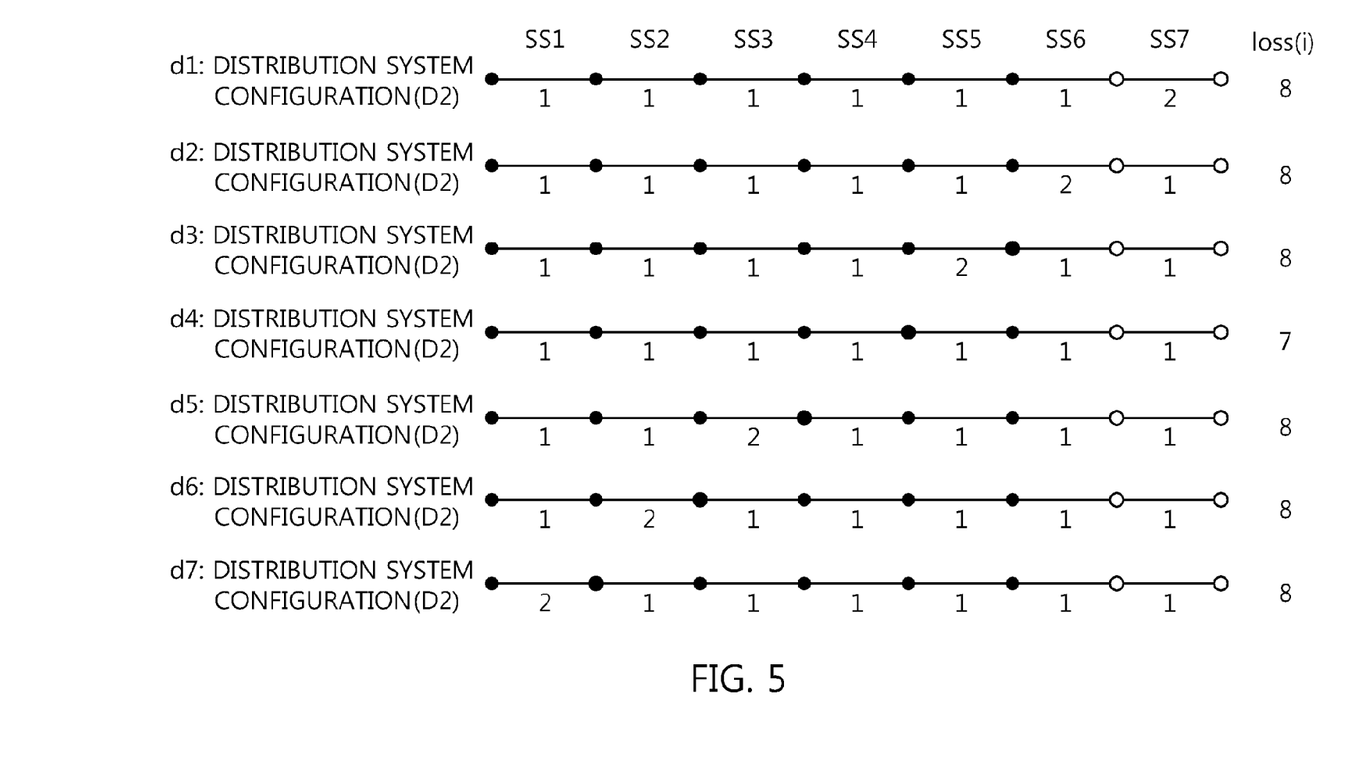

Furthermore, the loss minimization solution determination unit 130 calculates the specific system configuration loss value of the distribution system configuration D2 by adding the section loads of the section SS1 to SS7 of a distribution system configuration D2 at respective time points d1 to d7 with the system configuration set to the distribution system configuration D2 during the loss calculation period d1-d7, as illustrated in FIG. 5.

In other words, since the loss value of each of the sections SS1 to SS6 of the distribution system configuration D2 at the time point d1 is "1" and the loss value of the section SS7 is "2," the total loss value calculation unit 120 calculates a loss value at the time point d1 as "loss(d1)=8." Furthermore, since the loss value of each of the sections SS1 to SS5 and SS7 of the distribution system configuration D1 at the time point d2 is "1" and the loss value of the section SS6 is "2," the total loss value calculation unit 120 calculates a loss value at the time point d2 as "loss(d2)=8." In the same manner, total loss value calculation unit 120 obtains the loss values of the sections of the distribution system configuration D2 at the respective remaining time points d3 to d7, that is, "loss(d3)=8," "loss(d4)=7," "loss(d5)=8," "loss(d6)=8," and "loss(d7)=8." Moreover, the total loss value calculation unit 120 obtains the total specific system configuration loss value "loss(D2to1 )=55" of the distribution system configuration D2 by adding the loss values at the respective time points d1 to d7 during the loss calculation period, as described in Equation 1.

Figure 6:
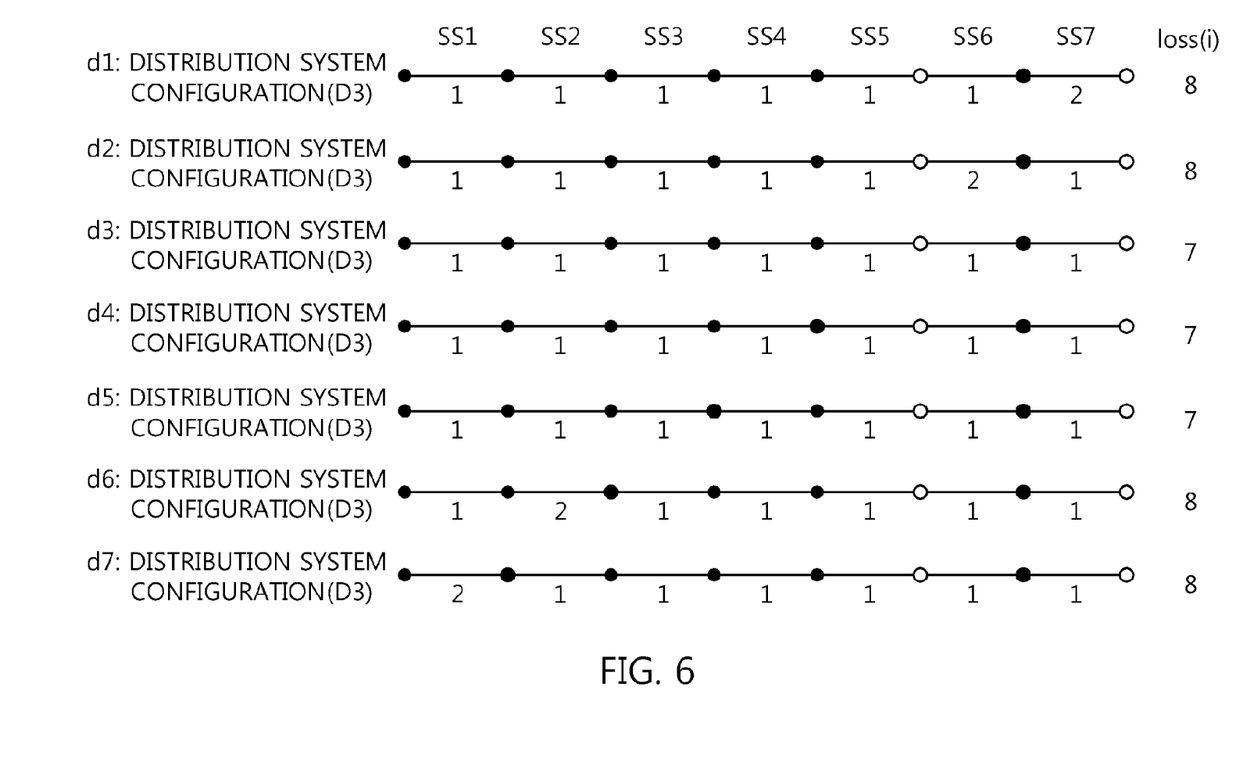
Figure 7:
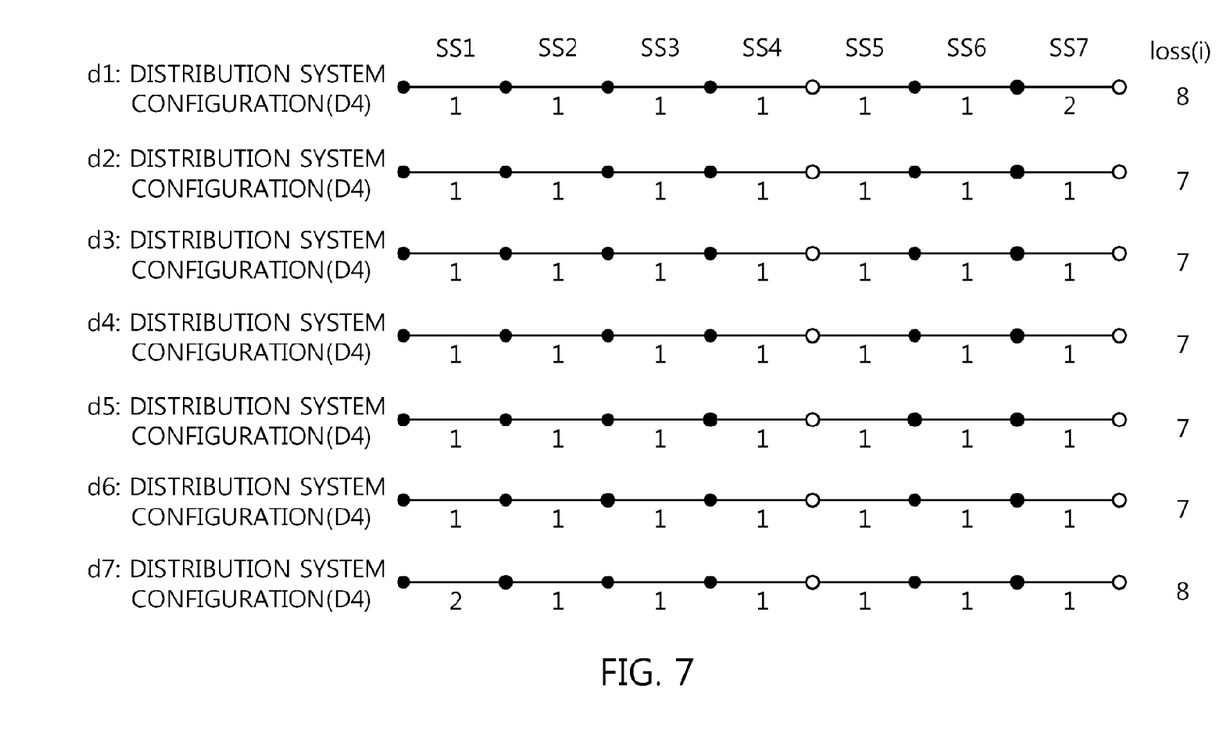
Figure 8:
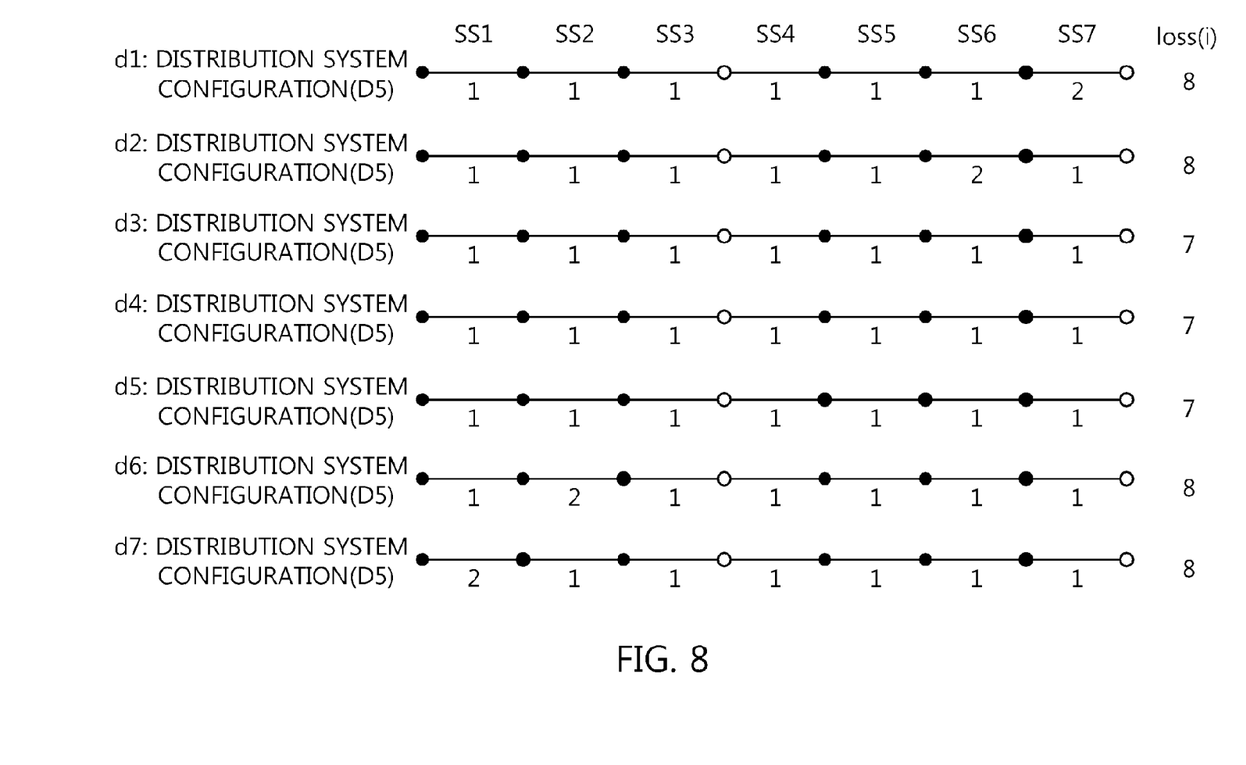
Figure 9:
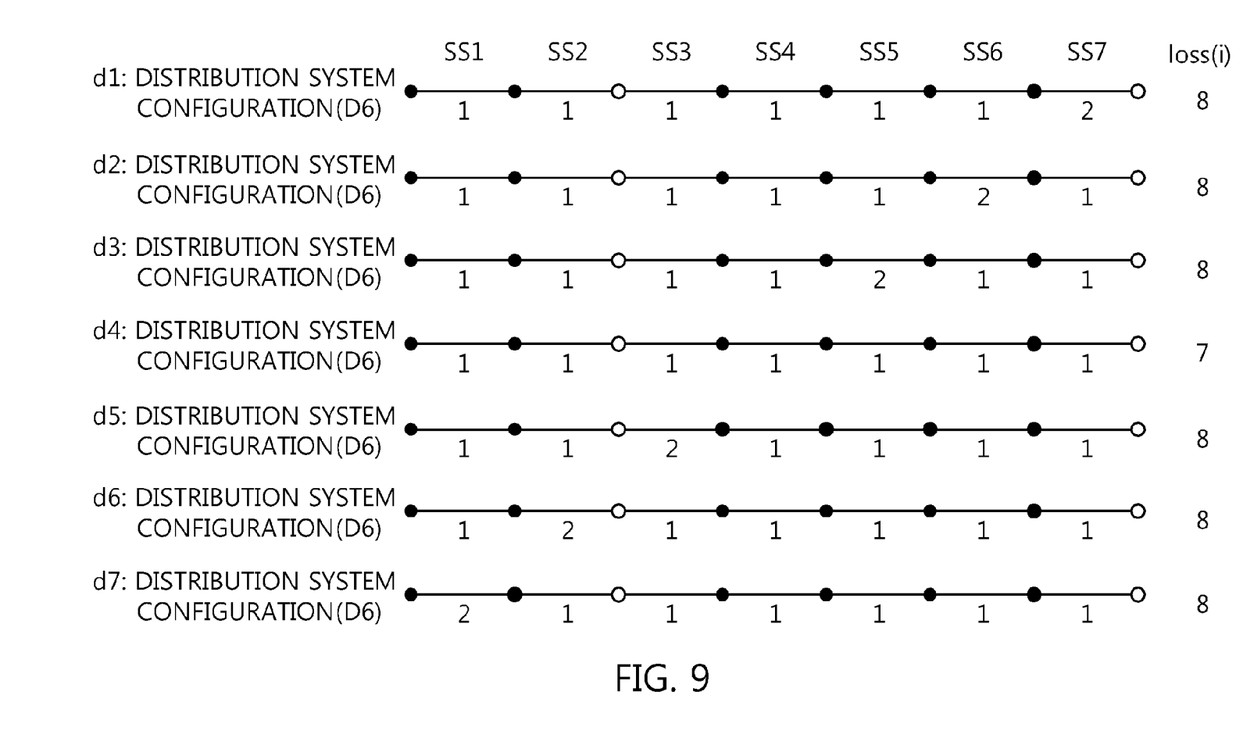
Figure 10:
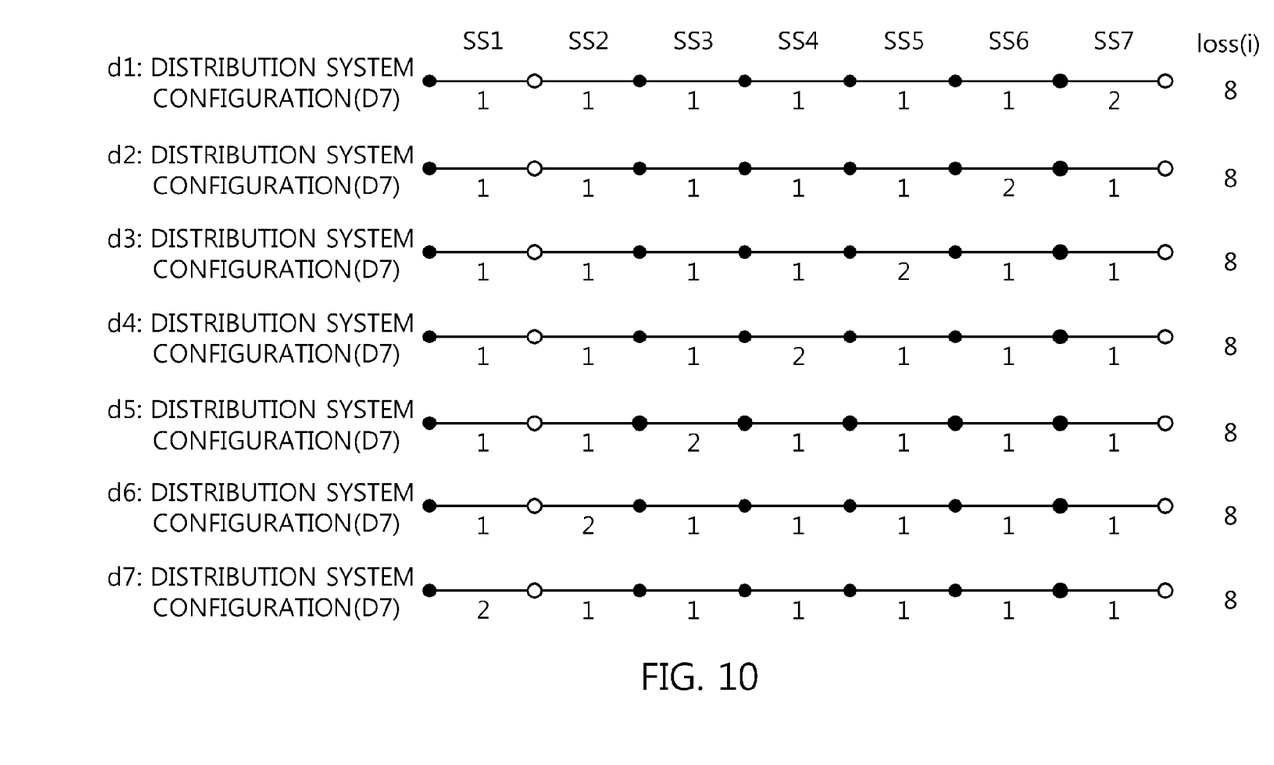

In the same manner as described above, the loss minimization solution determination unit 130 calculates the total specific system configuration loss value "loss(D3to1 )=53" of a distribution system configuration D3 with the system configuration set to the distribution system configuration D3 during the loss calculation period d1-d7, as illustrated in FIG. 6, calculates the total specific system configuration loss value "loss(D4to1 )=51" of the distribution system configuration D4 with the system configuration set to the distribution system configuration D4 during the loss calculation period d1-d7, as illustrated in FIG. 7, calculates the total specific system configuration loss value "loss(D5to1 )=53" of the distribution system configuration D5 with the system configuration set to the distribution system configuration D5 during the loss calculation period d1-d7, as illustrated in FIG. 8, calculates the total specific system configuration loss value "loss(D6to1 )=5" of a distribution system configuration D6 with the system configuration set to the distribution system configuration D6 during the loss calculation period d1-d7, as illustrated in FIG. 9, and calculates the total specific system configuration loss value "loss(D7to1 )=56" of a distribution system configuration D7 with the system configuration set to the distribution system configuration D7 during the loss calculation period d1-d7, as illustrated in FIG. 10.

Furthermore, the loss minimization solution determination unit 130 detects a loss minimization time point by comparing the specific system configuration loss values of the respective distribution system configurations, that is, "loss(D1to1 )=56," "loss(D2to1 )=55," "loss(D3to1 )=53," "loss(D4to1 )=51," "loss(D5to1 )=53," "loss(D6to1 )=55" and "loss(D7to1 )=56," with the total loss value "losstotal=49." In this case, the specific system configuration loss values of the respective distribution system configurations have been calculated by considering variations in the section load of the distribution system, with each of the distribution system configurations having been selected once during the loss calculation time period d1-d7. That is, the loss minimization solution determination unit 130 selects the specific system configuration loss value "loss(D4to1 )=51" closest to the total loss value "losstotal=49," and sets the time point d4, which belongs to the loss calculation time points d1 to d7 and at which the distribution system configuration D4 corresponding to the specific system configuration loss value "loss(D4to1 )=51" has been set, as a loss minimization solution, that is, a representative loss minimization time point T. The loss minimization solution determination unit 130 transfers information about the distribution system configuration D4 corresponding to the time point d4, set as the representative loss minimization time point T, to the system reconfiguration unit 140.

Referring back to FIGS. 2 and 3, the system reconfiguration unit 140 receives the information about the distribution system configuration corresponding to the representative loss minimization time point T from the loss minimization solution determination unit 130. Furthermore, the system reconfiguration unit 140 performs reconfiguration by applying the distribution system configuration corresponding to representative loss minimization time point T to the system configuration of the distribution system.

For example, if the time point d4 is set as the representative loss minimization time point T, the system reconfiguration unit 140 performs reconfiguration by applying the distribution system configuration D4 at the time point d4 to the system configuration of the distribution system.

Figure 11:
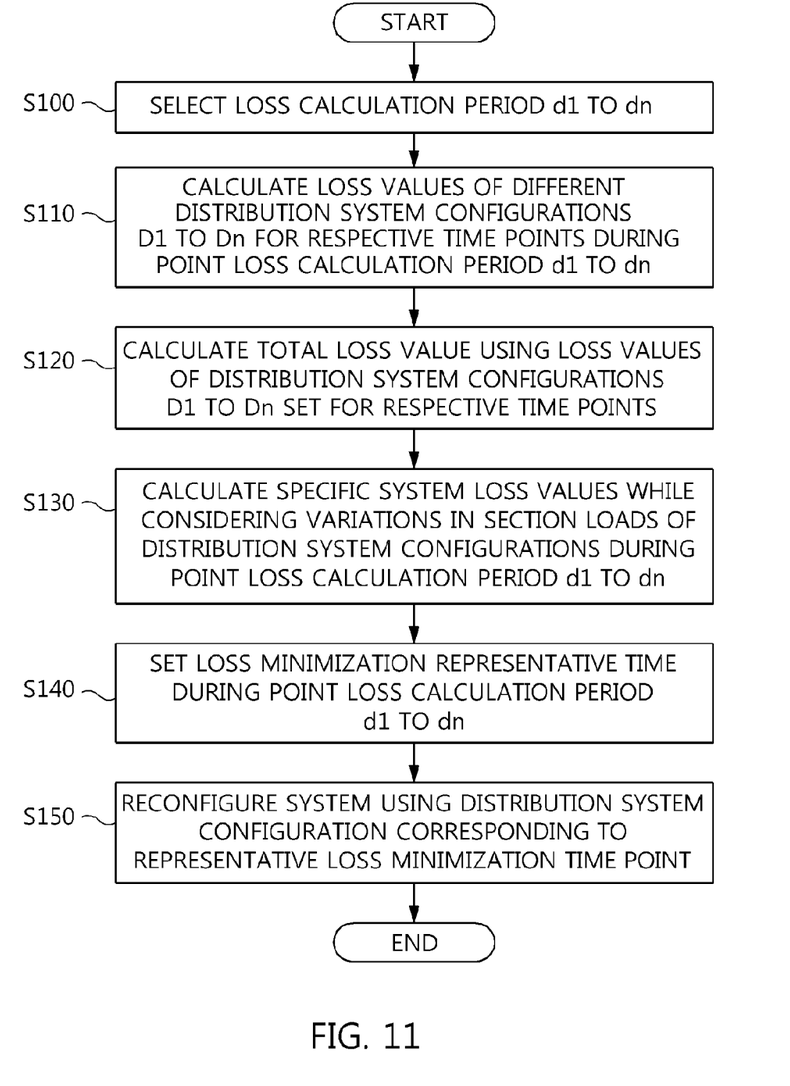
FIG. 11 is a flowchart illustrating a method of reconfiguring a distribution system while considering the section load characteristics of the distribution system in an apparatus for minimizing distribution loss according to an embodiment of the present invention.

FIG. 11 is a flowchart illustrating a method of reconfiguring a distribution system while considering the section load characteristics of the distribution system in an apparatus for minimizing distribution loss according to an embodiment of the present invention.

As illustrated in FIG. 11, the calculation period selection unit 110 of the apparatus 100 for minimizing distribution loss according to the embodiment of the present invention selects a loss calculation period d1-dn for calculating a loss minimization time point using different distribution systems at step S100.

Once the loss calculation period d1-dn has been selected, the total loss value calculation unit 120 calculates the loss value loss(di) of each of different distribution system configurations D1 to Dn set for respective time points of the loss calculation period at step S110. Furthermore, the total loss value calculation unit 120 calculates a total loss value losstotal by adding the loss values loss(d1-dn) of the different distribution system configurations D1 to Dn set for the respective time points of the loss calculation period loss calculation period d1-dn at step S120.

Thereafter, the loss minimization solution determination unit 130 selects each of the different distribution systems once during the loss calculation period d1-dn, and calculates specific system configuration loss values while considering variations in the section load of the selected distribution systems at step S130.

More specifically, the loss minimization solution determination unit 130 calculates the specific system configuration loss value loss(D1to1 ) of the distribution system configuration D1 by adding the section loads of the sections SS1 to SS7 of the distribution system configuration D1 at the time points d1 to d7, with the system configuration being set to the distribution system configuration D1 during the loss calculation period d1-d7 (see FIG. 4). In the same manner, the loss minimization solution determination unit 130 calculates a specific system configuration loss value loss(D2to1 ) with the system configuration set to the distribution system configuration D2 (see FIG. 5). Likewise, the loss minimization solution determination unit 130 calculates specific system configuration loss values (D2to1 )-loss(Dnto1) with the system configuration set to the remaining distribution system configurations D3 to Dn (see FIGS. 6 to 10).

Furthermore, the loss minimization solution determination unit 130 sets a time point at which a distribution system corresponding to a specific system configuration loss value, which belongs to the specific system configuration loss values and is closest to the total loss value losstotal has been set, as a representative loss minimization time point T at step S140.

The system reconfiguration unit 140 receives information about the distribution system configuration corresponding to the representative loss minimization time point T from the loss minimization solution determination unit 130. The system reconfiguration unit 140 performs reconfiguration by applying the distribution system configuration corresponding to the representative loss minimization time point T to the system configuration of the distribution system at step S150.

While a distribution system has been reconfigured by considering the section load characteristics of the distribution system in the embodiments of the present invention, the present invention is not limited thereto. The present invention, in order to equalize loads on distribution lines, may be configured to determine a specific period, to obtain a time point at which an equalized load during the corresponding period is closest to an average equalized load during the specific period, and to apply a load equalization solution using the time point as the representative time point of the corresponding period, thereby equalizing loads on distribution lines.

As described above, in an embodiment of the present invention, a loss calculation period is previously selected, a distribution system configuration representative of the loss calculation period is determined, and a distribution system is reconfigured in real time. Accordingly, the distribution system can be reconfigured by calculating an optimal solution without performing unnecessary processes, such as remote measurement, state prediction and system analysis, and the number of line opening and closing operations for minimizing risks attributable to the life span of a switch, an erroneous operation and no operation can be reduced.

Furthermore, in an embodiment of the present invention, with system sections being set for each distribution system configuration during a loss calculation period, a period for which a specific system configuration loss value is minimized with respect to variations in the section loads of each calculation period is set as a loss minimization solution, and distribution system configurations at sites in the field are reconfigured using a distribution system configuration corresponding to the loss minimization solution, thereby minimizing losses and equalizing loads and thus ensuring economic efficiency and the stability of the system.

As described above, the optimum embodiments have been disclosed in the drawings and the specification. Although the specific terms have been used herein, they have been used merely for the purpose of describing the present invention, and have not been used to limit the meanings thereof and the scope of the present invention set forth in the claims. Therefore, it will be understood by those having ordinary knowledge in the art that various modifications and other equivalent embodiments can be made. As a result, the technical range of the protections of the present invention should be defined by the technical spirit of the attached claims.

The invention claimed is:

1. An apparatus for minimizing distribution loss, the apparatus reconfiguring a system configuration of a distribution system while considering section load characteristics of different distribution systems, the apparatus comprising:
   a calculation period selection unit configured to determine a loss calculation period for detecting a loss minimization time point using the different distribution systems;
   a total loss value calculation unit configured to calculate a total loss value by calculating loss values of the different distribution systems set for respective time points of the loss calculation period; and
   a loss minimization solution determination unit configured to select each of the different distribution systems once during the loss calculation period, and to calculate a specific system configuration loss value of each of the distribution systems while considering variations in section load of the selected distribution system,
   wherein the loss minimization solution determination unit determines the loss minimization time point using the specific system configuration loss values of the distribution systems and the total loss value, and
   wherein the loss minimization solution determination unit selects a specific system configuration loss value that belongs to the specific system configuration loss values and is closest to the total loss value of the distribution system, and determines a time point, at which a distribution system corresponding to the closest specific s stem configuration loss value during the loss calculation period has been set, to be the loss minimization time point.

2. The apparatus of claim 1, further comprising a system reconfiguration unit configured to reconfigure the system configuration of the distribution system using a distribution system corresponding to the loss minimization time point.

3. The apparatus of claim 1, wherein the total loss value calculation unit calculates a loss value of each of the distribution systems for the respective time points by adding section loads of each of the distribution systems set for the respective time points of the loss calculation period, and calculates the total loss value by adding the loss values of the respective distribution systems.

4. The apparatus of claim 1, wherein the loss minimization solution determination unit calculates a loss value for each of the time points by adding section loads of the selected distribution system for each of the time points of the loss calculation period, and calculates a specific system configuration loss value of the selected distribution system by adding the loss values for the respective time points.

5. A method of minimizing distribution loss, the method reconfiguring a system configuration of a distribution system while considering section load characteristics of different distribution systems, the method comprising:
   determining a loss calculation period for detecting a loss minimization time point using the different distribution systems;
   calculating a total loss value by calculating loss values of the different distribution systems set for respective time points of the loss calculation period;
   selecting each of the different distribution systems once during the loss calculation period, and calculating a specific system configuration loss value of each of the distribution systems while considering variations in section load of the selected distribution system; and
   determining the loss minimization time point using the specific system configuration loss values of the distribution systems and the total loss value,
   wherein determining the loss minimization time point comprises:
   selecting a specific system configuration loss value that belongs to the specific system configuration loss values and is closest to the total loss value of the distribution system; and
   determining a time point, at which a distribution system corresponding to the closest specific system configuration loss value during the loss calculation period has been set, to be the loss minimization time point.

6. The method of claim 5, further comprising reconfiguring the system configuration of the distribution system using a distribution system corresponding to the loss minimization time point.

7. The method of claim 5, wherein calculating the total loss value comprises:
   calculating a loss value of each of the distribution systems for the respective time points by adding section loads of each of the distribution systems set for the respective time points of the loss calculation period; and
   calculating the total loss value by adding the loss values of the respective distribution systems.

8. The method of claim 5, wherein calculating the specific system configuration loss value comprises:

calculating a loss value for each of the time points by adding section loads of the selected distribution system for each of the time points of the loss calculation period; and calculating a specific system configuration loss value of the selected distribution system by adding the loss values for the respective time points.

\* \* \* \* \*